UNITED STATES PATENT OFFICE.

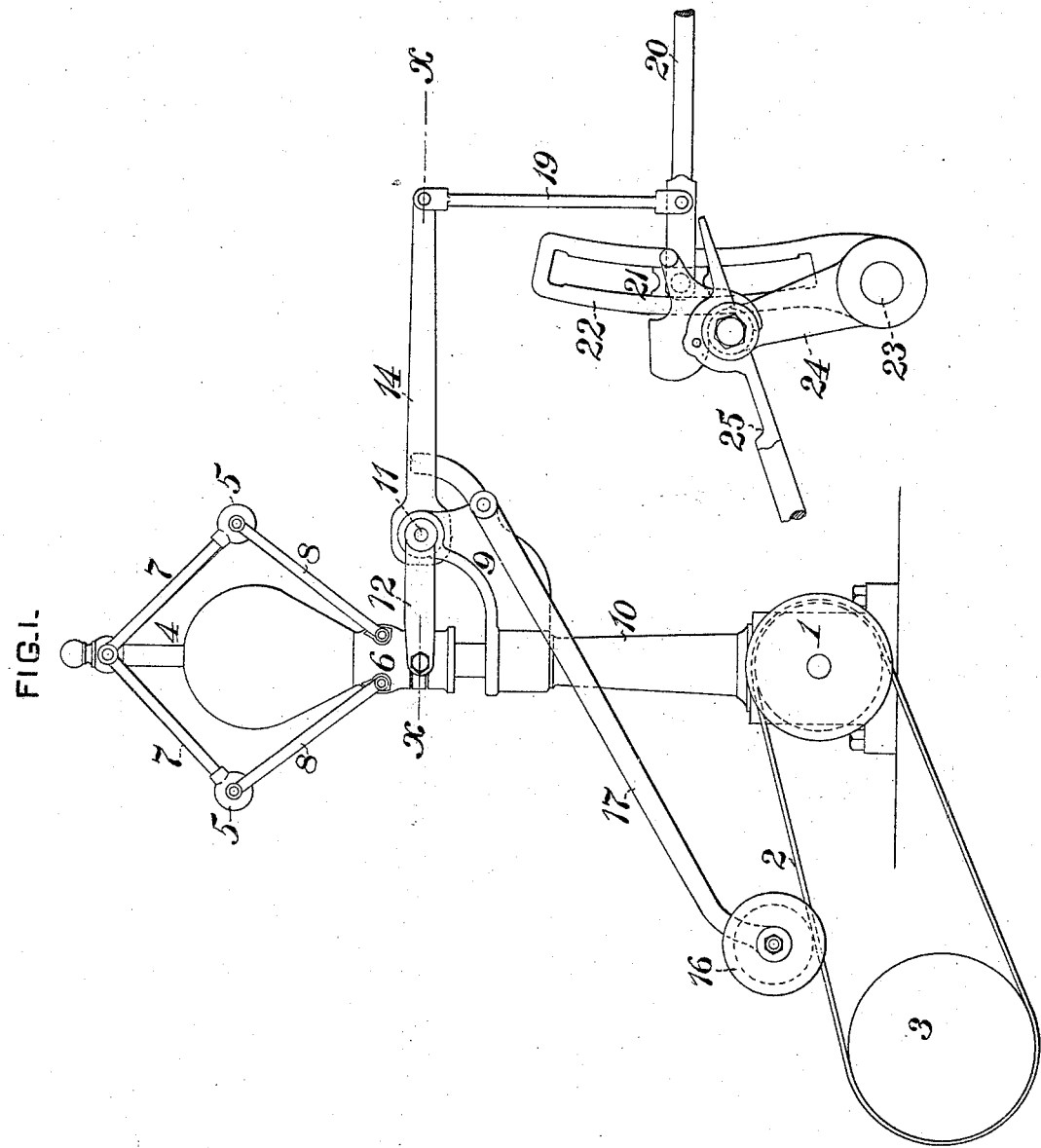

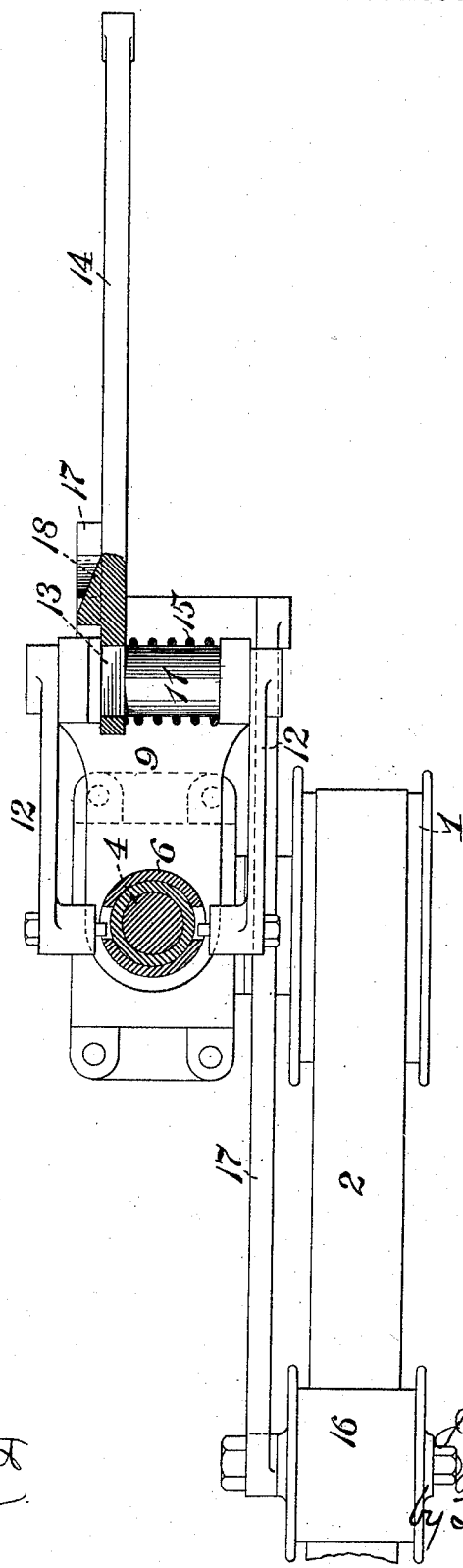

JAMES HEMPHILL AND JOSEPH FAWELL, OF PITTSBURG, PENNSYLVANIA.

GOVERNOR.

SPECIFICATION forming part of Letters Patent No. 482,448, dated September 13, 1892.

Application filed February 15, 1892. Serial No. 421,643. (No model.)

*To all whom it may concern:*

Be it known that we, JAMES HEMPHILL and JOSEPH FAWELL, citizens of the United States, residing at Pittsburg, in the county of Allegheny and State of Pennsylvania, have invented or discovered certain new and useful Improvements in Governors, of which the following is a specification.

In applications of even date herewith we have described and claimed certain improvements in governors for steam-engines whereby in case of eruption of the governor-driving belt one end of the lever employed in transmitting the movements of the governor to the valve of the engine is so shifted and in such direction as to move the engine-valve over the inlet-ports of the cylinder. In one of these cases provision was made for removing the pivotal support of the lever and in the other for shifting the rear end of the lever in the same direction, and to an equal or greater extent as it would be shifted by an abnormal speed of the governor. In the present invention the lever is formed in two parts, which are normally locked in parallelism with each other, and means are provided whereby the outer end of the lever may be shifted or unlocked so as to permit it to drop, and thereby through suitable interposed mechanism shift the valve of the engine so as to cut off steam from entrance to the cylinder.

The invention is more fully hereinafter described and claimed.

In the accompanying drawings, forming a part of this specification, Figure 1 is a view in side elevation of a governor embodying our invention and showing one manner of connecting the same to the valve-operating mechanism of an engine, and Fig. 2 is a sectional plan view of the same, the plane of section being indicated by the line $x\,x$, Fig. 1.

In the practice of our invention the pulley 1 of the governor is driven by a belt 2 from the shaft 3 of the engine or a pulley thereon.
The shaft of the pulley 1 is connected by the usual gearing to the vertical shaft 4, and the balls 5 are connected to the head of the vertical shaft, and the sleeve 6, sliding thereon, by arms 7 and 8.
In the upper end of a bracket 9, formed on the hollow support 10 of the vertical shaft are formed suitable bearings for the pivot-pin 11. The ends of this pin have arms 12 attached thereto, whose opposite ends are connected to the sliding sleeve 6, so that the pivot-pin 11 will be oscillated in its bearings by the sleeve 6 when moved up or down by the balls 5. The pivot-pin 11 is provided with a squared portion 13 inside of its bearings, the remaining portion of the pin being round and of a diameter not greater than the diagonal of the squared portion 13. The inner end of the lever 14 is provided with a square or angular opening fitting on the squared or angular portion 13, so that as said pin is oscillated a vertical movement will be imparted to the outer end of the lever. The lever is normally held on the squared portion of the pivot-pin by a spring 15, as shown in Fig. 2, but can be shifted against the tension of the spring onto the round portion of the pin, so that the free end of the lever may drop down. As a means for effecting this lateral shifting of the lever from the angular to the rounded portion of the pin a lever 17 is pivoted to the bracket 9, and has at one end a flanged wheel 16, normally resting on the belt 2. The opposite end of this lever 16 is bent up alongside of the lever 14, so that in case of a rupture of the belt 2 and a consequent dropping down of the pulley the upper end of the lever will be moved along the surface of a wedge 18, formed on the lever 14, thereby shifting said lever laterally against the tension of the spring. The outer end of the lever 14 is connected by a rod 19 to the valve-stem 20, which is connected at one end to the valve of the engine and at the opposite end to the block 21, arranged in the slot of the link 22. This link is attached to a shaft 23, which is also provided with an arm 24, connected by the rod 25 to the eccentric of the engine. It will be readily understood from the foregoing that as the pulley end of the lever 16 drops in case of a rupture of the belt 2 the lever 14 will be shifted onto the rounded portion of the pivot-pin 11, and that its free outer end will drop down, thereby shifting the block 21 into such proximity to the center of movement of the link 22 that the slight oscillation of said link at that point will not shift the valve from over the inlet-ports of the cylinder of the engine, into which position they were moved by the dropping down of the block 21.

We claim herein as our invention—

1. The combination of a governor, a lever operated by the governor and adapted to regulate the movement of the valve controlling the flow of steam to the cylinder of the engine, said lever being formed in two sections, and a lock for normally holding the sections of said lever in approximate parallelism with each other, substantially as set forth.

2. The combination of a governor, a lever operated by the governor and adapted to regulate the movements of the valve controlling the flow of steam to the cylinder of the engine, said lever being formed in two parts or sections, a lock for holding such sections in approximate parallelism with each other, and means operative on the rupture of the governor-driving belt for unlocking said sections, substantially as set forth.

3. The combination of a governor, a pivot-pin connected with the sleeve of said governor and oscillated thereby, said pin being provided with an angular and a rounded portion, a lever normally fitting on said angular portion, and means operative on a rupture of the governor-driving belt for shifting the lever onto the rounded portion of the pivot-pin, substantially as set forth.

In testimony whereof we have hereunto set our hands.

JAMES HEMPHILL.
JOSEPH FAWELL.

Witnesses:
DARWIN S. WOLCOTT,
R. H. WHITTLESEY.